(12) United States Patent
Hasenauer et al.

(10) Patent No.: US 11,479,306 B2
(45) Date of Patent: Oct. 25, 2022

(54) MATERIAL-OPTIMIZED CONNECTION NODE

(71) Applicants: EDAG Engineering GmbH, Wiesbaden (DE); Fraunhofer-Gesellschaft zur Förderung der angewandten Forschung e.V., Munich (DE); Constellium Singen GmbH, Singen (DE); Concept Laser GmbH, Lichtenfels (DE); BLM S.p.A., Cantù (IT)

(72) Inventors: Thomas Hasenauer, Grossenlueder (DE); Sven Orloff, Hamburg (DE); Martin Hillebrecht, Petersberg (DE); Claus Emmelmann, Seevetal-Horst (DE); Frank Beckmann, Hamburg (DE)

(73) Assignees: EDAG ENGINEERING GMBH, Wiesbaden (DE); FRAUNHOFER-GESELLSCHAFT ZUR FÖRDERUNG DER ANGEWANDTEN FORSCHUNG E.V., Munich (DE); CONSTELLIUM SINGEN GMBH, Singen (DE); CONCEPT LASER GMBH, Lichtenfels (DE); BLM S.P.A., Cantù (IT)

( * ) Notice: Subject to any disclaimer, the term of this patent is extended or adjusted under 35 U.S.C. 154(b) by 312 days.

(21) Appl. No.: 16/645,182

(22) PCT Filed: Sep. 10, 2018

(86) PCT No.: PCT/EP2018/074318
§ 371 (c)(1),
(2) Date: Mar. 6, 2020

(87) PCT Pub. No.: WO2019/048680
PCT Pub. Date: Mar. 14, 2019

(65) Prior Publication Data
US 2020/0406984 A1 Dec. 31, 2020

(30) Foreign Application Priority Data

Sep. 8, 2017 (DE) .......................... 202017105474.8

(51) Int. Cl.
*B62D 27/02* (2006.01)
*B29C 65/00* (2006.01)
(Continued)

(52) U.S. Cl.
CPC ...... *B62D 27/023* (2013.01); *B29C 66/52441* (2013.01); *B62D 27/026* (2013.01);
(Continued)

(58) Field of Classification Search
CPC ................ B62D 27/023; B62D 27/026; B29C 66/52441; B29C 65/48; B29L 2031/30; B33Y 10/00; B33Y 80/00
(Continued)

(56) References Cited

U.S. PATENT DOCUMENTS

| 6,742,258 B2 | 6/2004 | Tarbutton et al. |
| 7,175,204 B2 | 2/2007 | Tarbutton et al. |

(Continued)

FOREIGN PATENT DOCUMENTS

| CN | 1596161 A | 3/2005 |
| CN | 101720292 A | 6/2010 |

(Continued)

OTHER PUBLICATIONS

International Search Report and Written Opinion for International Application No. PCT/EP2018/074318, dated Dec. 13, 2018, 13 pages.
Office Action, including Search Report, for Chinese Patent Application No. 201880058532.7, dated Nov. 2, 2021, 12 pages.

*Primary Examiner* — Pinel E Romain
(74) *Attorney, Agent, or Firm* — Westman, Champlin & Koehler, P.A.

(57) ABSTRACT

The present invention relates to a system consisting of a connection node and at least one first connection body, wherein: the connection node comprises a connection node central body, a first connection element for joining with the (Continued)

connection body, and at least one second connection element for joining with a second connection body; the first connection element and the second connection element are connected or may be connected to the connection node central body; and at least one portion of the connection node central body and/or of the first connection element and/or of the second connection element is manufactured by means of an additive process, for example 3D printing, or by means of a casting process.

20 Claims, 4 Drawing Sheets

(51) Int. Cl.
  *B33Y 10/00* (2015.01)
  *B33Y 80/00* (2015.01)
  *B29C 65/48* (2006.01)
  *B29L 31/30* (2006.01)

(52) U.S. Cl.
  CPC ........... *B29C 65/48* (2013.01); *B29L 2031/30* (2013.01); *B33Y 10/00* (2014.12); *B33Y 80/00* (2014.12)

(58) Field of Classification Search
  USPC .................................................. 296/203.01
  See application file for complete search history.

(56) References Cited

U.S. PATENT DOCUMENTS

| | | | |
|---|---|---|---|
| 9,567,013 B2* | 2/2017 | Ehrlich | B62D 27/02 |
| 9,884,663 B2* | 2/2018 | Czinger | B62D 27/023 |
| 9,969,439 B2* | 5/2018 | Ehrlich | B62D 27/026 |
| 9,975,179 B2* | 5/2018 | Czinger | G06F 30/15 |
| 10,286,961 B2 | 5/2019 | Hillebrecht et al. | |
| 10,384,727 B2 | 8/2019 | Eidmann et al. | |
| 11,155,005 B2* | 10/2021 | Gunner | B29C 33/3842 |
| 2003/0102668 A1 | 6/2003 | Tarbutton et al. | |
| 2003/0152745 A1 | 8/2003 | Wagenblast | |
| 2004/0195817 A1 | 10/2004 | Tarbutton et al. | |
| 2010/0181804 A1 | 7/2010 | Malvino | |
| 2011/0158741 A1 | 6/2011 | Knaebel | |
| 2017/0057558 A1 | 3/2017 | Hillebrecht et al. | |
| 2017/0100767 A1 | 4/2017 | Brauch et al. | |
| 2017/0158253 A1 | 6/2017 | Eidmann et al. | |
| 2021/0129448 A1* | 5/2021 | Czinger | F16B 9/07 |

FOREIGN PATENT DOCUMENTS

| | | |
|---|---|---|
| CN | 102019966 A | 4/2011 |
| DE | 100 22 360 A1 | 11/2001 |
| DE | 197 21 478 B4 | 11/2004 |
| DE | 10 2014 207 565 A1 | 10/2015 |
| DE | 20 2016 105 052 U1 | 4/2017 |
| EP | 3 135 566 A1 | 3/2017 |
| EP | 3 165 430 A1 | 5/2017 |
| WO | 2017/040728 A1 | 3/2017 |

* cited by examiner

MATERIAL-OPTIMIZED CONNECTION NODE

CROSS-REFERENCE TO RELATED APPLICATION(S)

This application is a Section 371 National Stage Application of International Application No. PCT/EP2018/074318, filed on Sep. 10, 2018, which published as WO 2019048680 A1, on Mar. 14, 2019, and claims priority to German Patent Application No. 202017105474.8, filed on Sep. 8, 2018, the contents of which are incorporated herein by reference in their entireties.

FIELD

The present invention relates to a connection node and a system comprising the connection node and at least one first connection body. The connection node comprises a one-part or multi-part connection node central body, a first connection element and at least one second connection element. The connection node may be manufactured at least partially by an additive process and/or a casting process.

BACKGROUND

Weight and material savings are of ever increasing importance, particularly when in the case of vehicles, such as automobiles or aircrafts. In addition, due to the limited installation space available, it is increasingly important to adapt the individual components as precisely as possible to the available installation space, as the external dimensions of the vehicle may not be changed at will for aerodynamic reasons and due to external specifications, such as a standard garage for motor vehicles.

It is therefore the task of every development to design and dimension a component, such as a connection node, in such a way that it is as light as possible, stable and durable, and that fits into a given space in a given installation space.

SUMMARY

It is an object of the present invention to provide a connection node which is light and compact. It is another object of the present invention to provide a system comprising the connection node and at least one connecting part to be joined to the connection node.

These objects are achieved by the features of the independent claims, respectively. Advantageous further embodiments are defined by the dependent claims.

In a first aspect of the present invention, a system is provided comprising a connection node and at least one first connection body, wherein the connection node comprises a one-part or multi-part connection node central body, a first connection element for joining to the first connection body and at least one second connection element for joining to a second connection body. The first connection element and the second connection element may be connected to the connection node central body or are connected to the connection node central body. At least a part of the connection node central body and/or the first connection element and/or the second connection element is/are manufactured by means of an additive process, for example 3D printing, or a casting process. In the case of an additive manufacturing process of the connection node or parts of the connection node, further functions may be integrated into the connection node, such as a cable or hose guide, connection elements or retainers for further components, and much more.

If the system is considered as such, a conventionally manufactured connection node may be divided into two or more smaller connection nodes, preferably at least partially manufactured in an additive process, which are connected to each other via connection bodies. This allows the total weight to be further reduced, and material and manufacturing time may be saved, thus reducing costs.

The multi-part connection node central body may, for example, be formed from two half-shells which are joined together to form the connection node central body, for example joined together in a form-fitting manner and/or welded and/or connected with screws and/or held together by means of a bracing belt. Other known types of joints suitable for the purpose, which are not explicitly mentioned here, are encompassed by the present invention. If there are more than two parts, for example three, four or more parts, the connection node central body may be assembled and joined part by part.

The first connection body may be a sheet metal plate, a plate, a profile body, a hollow profile body with or without internal reinforcing struts, or a multi-chamber hollow profile body. The profile body may have an open cross-section, i.e. U-shaped or V-shaped cross-section, or a closed cross-section, for example a round, triangular, square, or polygonal cross-section. The profile bodies may be manufactured by extrusion, pultrusion or extrusion, or any other suitable processes. The bodies of the profiles may be made of metal, such as steel or aluminum, or may be made of plastic materials, in particular a reinforced plastic material, or may comprise at least one of these materials. The walls of all sections may have the same or different wall thickness. This means, for example, that in the case of a rectangular profile, at least one of the four walls may have a wall thickness which differs from the wall thickness of at least one of the other walls. In the case of multi-chamber hollow profiles, the same applies to the chamber walls which form the chambers of the multi-chamber profile and separate them from each other. In the case of the reinforcing struts the same applies for the mold, i.e. height transverse to the longitudinal axis of the profile and thickness may differ from each other. Calculations of possible load cases for each individual profile used in the system and/or measurement results from corresponding tests may serve as a basis for dimensioning the profile walls.

The material for the connection node central body may also comprise metal and/or plastic or at least one of these materials. If at least parts of the connection node central body are manufactured by means of an additive process, this may mean that these additively manufactured parts are manufactured separately and joined to the remaining body after manufacture, or that the parts to be manufactured additively are built up or attached directly to the remaining body. In other words, the remaining body which is not manufactured additively serves as the basis on which the additively manufactured part or parts are "printed", for example, by means of the 3D printing process.

According to the optimization of the connection node and connection bodies of the present invention, the mass of the system may be reduced by about 50% or more.

The additive process may be 3D printing process, a laser-sintering process or any other additive manufacturing process.

In the following, the terms "first connection element" and "connection element" as well as "first connection body" and "connection body" are used, wherein the term "connection element" always denotes the "first connection element and/or second connection element", and the term "connection body" always denotes the "first connection body and/or second connection body". Any statements with respect to the "first connection element" and the "first connection body" may also apply accordingly to the second and all further connection elements and connection bodies.

The connection body may be joined in any user-defined way with the connection node central body. This means that it may be positively locked, welded, screwed, riveted, glued, and so on to the connection node central body. The type of connection depends in particular on whether the connection is to be detachable, for example for inspection, maintenance or replacement, or whether a non-destructive separation of the two parts is acceptable.

For bonding by means of a preferably liquid or at least flowable adhesive, the connection node central body or the first connection body may have at least one recess on at least one of the circumferential outer walls of an end face facing the connection node central body, through which the adhesive may be inserted into an adhesive connection consisting of the first connection element and the first connection body preferably slid onto the first connection element. Instead of the described recess, the connection body may have a hole near the end face facing the connection node central body, through which adhesive may be inserted. In the case of multi-chamber hollow profiles, one hole may be provided for each chamber. This has the advantage of reducing the lengths of the flow paths for the adhesive, thereby improving the wetting reliability. The present invention also comprises a device similar to a grease nipple through which the adhesive may be inserted. This device may comprise a check valve to prevent backflow of the adhesive from the interface between the connection body and the connection element.

Alternatively, one end of the connection body may be inserted into the connection element. In this case, the recess may be formed on an inside of the connection element and/or on an outside of the connection element. It is advantageous if the interface between the connection element and the connection body is flat, i.e. the outer sides of the connection element and the connection body are arranged in one plane in the area of the interface, as this prevents the risk of injury from sharp edges. Furthermore, it is prevented that dirt accumulates in the edge area.

The first connection element may protrude beyond an outer circumferential edge of the connection node central body or be formed inside the connection node central body such that the connection body is arranged with one end face inside the connection node central body when the connection body is connected to the connection node central body. In the case of an external seam, an unavoidable seam groove may be sealed with a thermoplastic material in order to seal the open flanks of, for example, the connection body, thus preventing corrosion and soiling. If the seam groove is inside the connection node central body, the adhesive may provide this function.

The adhesive may be inserted or pressed into the adhesive connection through the above-mentioned recesses or holes etc. at a specified minimum pressure of, for example, 2 bar to 8 bar, preferably 2.5 bar to 7 bar, and particularly preferably from 3 bar to 6 bar. Alternatively, the adhesive may also be applied as a thin dry layer or film to the connection element and/or the connection body prior to joining, and then may be activated, for example, by applying heat. In this case, the recesses or holes described above may support transferring the heat to the adhesive. Preferably, the adhesive increases in volume after activation in order to compensate for possible tolerances between the connection element and the connection body.

The first connection element may comprise several engagement elements on an end face facing the connection body to be accommodated, which in this case may in particular be a multi-chamber hollow profile, which are adapted to engage in several or all chambers of the multi-chamber hollow profile. This means that the end face may in this case is particularly adapted to engage in several or all chambers of the hollow sections. In this case, any of the engagement elements may comprise a pocket at least on one of the sides facing an inner side of an outer wall of the connection node central body or the connection body into which the adhesive may penetrate. The engagement elements may be formed, for example, by a reinforcing structure for the connection element and/or the connection node central body with recesses in the reinforcing structure in which the walls and/or chamber walls of the connection body may engage.

The system described above may, for example, be part of a vehicle frame in which the connection node connects the parts of the vehicle frame together, for example in the area of a suspension strut. The second connection element or a third connection element may, in this case, form a suspension strut mount or be connected to or joined to a suspension strut mount.

If the connection node connects several connection bodies with each other, whereby several or all connection bodies are a hollow chamber profile, the second connection element and/or the third connection element and/or each further connection element is also to be connected with a multi-chamber hollow profile. If different multi-chamber hollow profiles are involved, each of the connection elements, or the engagement elements formed on the connection element, may be particularly adapted for the respective multi-chamber hollow profile to be received.

In a further aspect of the present invention, a connection node for connecting a first connection body and at least one second connection body is provided. The connection node comprises a one-part or multi-part connection node central body, a first connection element for connecting to the first connection body and at least one second connection element for connecting to the at least one second connection body. The central connection node body and/or the first connection element and/or the second connection element is/are manufactured by means of an additive process and/or by means of a casting process.

All features described with respect to the connection node in the first aspect are also suitable for the connection node in the second aspect, and vice versa.

The multi-part connection node central body may, for example, be formed from two half-shells which are joined together to form the connection node central body, for example joined together in a positive-locking manner and/or welded and/or connected with screws and/or held together by means of a bracing belt. Other known types of connections suitable for the purpose, which are not explicitly mentioned here, are included in the present invention. If there are more than two parts, for example three, four or more parts, the connection node central body may be assembled and joined part by part.

The connection node central body may be connected to the first connection element and the at least one second connection element or to be connected. The connection node central body and the at least two connection elements may be integrally molded in one part. This means, for example, that the connection node central body and the connection element or the at least two connection elements are cast in a single mold, preferably in a single step, or are printed together using an additive process such as 3D printing.

The connection node central body and the first connection element and preferably the at least one second connection element may alternatively be manufactured at least partially by means of the additive process. The parts may be manufactured separately and only connected to each other in a later step, or the parts which are not manufactured by means of the additive process may serve as a basis on which or to which the additively manufactured parts may be attached.

The additively manufactured connection node central body may have a skeleton structure, with, for example, local stiffeners and/or adapted wall thicknesses. This provides a lightweight structure, using as little material as possible, which results in a low weight of the connection node central body. The exact arrangement of the stiffeners and the optimum strut or wall thickness may be calculated on the computer on the basis of the expected loads on the components. Thus, for example, truss structures may be formed which secure optimum force transmission, internal or external surface structures may be replaced by grid structures, hollow structures, with or without internal reinforcing struts or honeycomb structures, may replace solid local node structures. The same may apply to the connection elements if they are additively manufactured together with the connection node central body.

The additively manufactured skeleton structure is optimized on the computer on the basis of theoretical calculations and actual measurements with regard to the force flows and the required strength. The resulting program serves as a control program for the additive process. The aim is to optimize the structure with regard to the force flows and to reduce the weight of the additively manufactured component. In the case of a connection node, the weight reduction may reach 50% and more. By means of parametric modulation, material thickness variations adapted to the load case may be easily simulated on the computer without the need for physical testing. The values of the load case are simply varied, which then leads to different material thicknesses or different structures, such as grid structure instead of plate structure, or hollow structure instead of a solid body. The CSG CAD solid model is particularly suitable for this purpose and provides useful support for variant and modification design, which may be necessary, for example, in the automotive sector when adapting to different types or identical types with different motorization.

Preferably, the additively manufactured connection node central body includes an additively manufactured and at least substantially closed outer skin in order to prevent soiling, for example. The outer skin of the connection node central body may have areas of different thickness, the respective thickness being adapted to the locally occurring force flow through the outer skin in the load case calculated and/or determined experimentally. This means that the outer skin may have a double function by defining an outer surface of the connecting node central body and at the same time reinforcing the outer skin at least in some areas, whereby it may be possible to save material for the skeletal structure arranged within the outer skin, thereby enabling a configuration which is more sophisticated.

The following aspects which contain features defining the present invention are worded as claims:

Aspect 1: System (100) comprising a connection node (1) and at least a first connection body (2, 3, 4), wherein the connection node (1) comprises: a one-part or multi-part connection node central body (5), a first connection element (6, 7, 8) for joining to the connection body (2, 3, 4) and at least a second connection element (6, 7, 8) for joining to a second connection body (2, 3, 4), wherein the first connection element (6, 7, 8) and the second connection element (6, 7, 8) are connected or being connectable to the connection node central body (5), wherein at least a part of the connection node central body (5) and/or the first connection element (6, 7, 8) and/or the second connection element (6, 7, 8) is/are manufactured by means of an additive process, for example 3D printing, and/or a casting process.

Aspect 2: System (100) according to aspect 1, wherein the first connection body (2, 3, 4) is a hollow profile, a hollow profile with internal connecting struts or a multi-chamber hollow profile.

Aspect 3: System (100) according to one of the preceding aspects, wherein the connection node central body (5) is joined to the connection body (2, 3, 4) by means of an adhesive.

Aspect 4: System (100) according to one of the preceding aspects, wherein the connection node central body (5) or the first connection body (2, 3, 4) comprises, near at least one of the circumferential outer walls of an end face facing the connection node central body (5), at least one opening (10, 11) through which the adhesive may be inserted into an adhesive connection consisting of the first connection element (6, 7, 8) and first connection body (2, 3, 4).

Aspect 5: System (100) according to the preceding aspect, wherein the first connection body (2, 3, 4) protrudes beyond an outer edge of the connection node central body (5) or is formed inside the connection node central body (5) such that the connection body (2, 3, 4) is arranged with an end face (2a, 3a, 4a) inside the connection node central body (5) when the connection body (2, 3, 4) is connected to the connection node central body (5).

Aspect 6: System (100) according to the preceding aspect, wherein the adhesive is inserted into the adhesive connection through the opening (10, 11) at a predetermined minimum pressure of 3 to 6 bar, for example.

Aspect 7: System (100) according to aspect 2, wherein the first connection element (6, 7, 8) comprises, at an end face facing the connection body (2, 3, 4) to be received, a plurality of engagement elements adapted to engage in a plurality of or all chambers of the multi-chamber hollow profile.

Aspect 8: System (100) according to the preceding aspect, wherein each of the engagement elements comprises, at least on one of the sides facing an inner side of an outer wall of the connection node central body (5) or the connection body (2, 3, 4), a pocket (13) into which the adhesive can penetrate.

Aspect 9: System (100) according to one of the preceding six aspects, wherein the adhesive compensates for tolerances of the parts to be joined together.

Aspect 10: System (100) according to one of the preceding aspects, wherein the connection node (1) connects parts of a vehicle frame to one another, and the second connection element (6, 7, 8) or a third connection element (6, 7, 8) forms a suspension strut mount or may be connected to a suspension strut mount.

Aspect 11: System (100) according to aspect 2, wherein the second connection element (6, 7, 8) and/or the third connection element (6, 7, 8) and/or any further connection element are adapted to be connected to a multi-chamber hollow profile.

Aspect 12: Connection node (1) for connecting to a first connection body (2, 3, 4) and at least a second connection body (2, 3, 4), wherein the connection node (1) comprises: a connection node central body (5), a first connection element (6, 7, 8) for connecting to the first connection body (2, 3, 4) and at least one second connection element (6, 7, 8) for connecting to the at least one second connection body (2, 3, 4), wherein the connection node central body (5) and/or the first connection element (6, 7, 8) and/or the second connection element (6, 7, 8) is/are manufactured by means of an additive process and/or by means of a casting process.

Aspect 13: Connection node (1) according to aspect 12, wherein the connection node central body (5) is connected, connectable or integrally primary formed in one part with the first connection element (6, 7, 8) and the at least one second connection element (6, 7, 8).

Aspect 14: Connection node (1) according to one of the two preceding aspects, wherein the connection node central body (5) and the first connection element (6, 7, 8) and preferably also the at least one second connection element (6, 7, 8) are at least partially manufactured by means of the additive process.

Aspect 15: Connection node (1) according to one of the three preceding aspects, wherein at least the connection node central body (5) is manufactured skeleton-shaped, having local stiffeners and wall thicknesses adapted to a local force flow.

Aspect 16: Connection node (1) according to one of the four preceding aspects, wherein the connection node central body (5) and the connection elements (6, 7, 8) comprise hollow structures preferably having stiffening structures (1b, 6b, 7b, 8b), such as for example a strut-, lattice- or honeycomb-structure adapted to the local force flow direction.

Aspect 17: Connection node (1) according to one of the five preceding aspects, wherein the connection node (1) comprises an at least substantially closed outer skin (1a) preferably manufactured by means of the additive process in order to prevent soiling.

Aspect 18: Connection node (1) according to the preceding aspect, wherein the wall thickness of the outer skin (1a) of the connection node central body (5) comprises portions of different thickness, wherein the thickness is adapted to the locally occurring force flow in the load case through the outer skin (1a).

Aspect 19: Connection node (1) according to one of the seven preceding aspects, wherein the connection elements (6, 7, 8) are arranged at an end face facing away from the connection node central body (5) of the connection node in order to be able to engage in a connection body (2, 3, 4), which may be a multi-chamber hollow profile, for example.

Aspect 20: Connection node (1) according to one of the eight preceding aspects, wherein the connection node central body (5) and the connection elements (6, 7, 8) are jointly primary formed in one part by means of the additive process.

Aspect 21: Connection node according to one of the nine preceding aspects, wherein the connection node (1) is the connection node (1) of the system (100) according to any of the aspects 1 to 11.

BRIEF DESCRIPTION OF THE DRAWINGS

In the following, an exemplary embodiment of the present invention is explained in more detail with respect to the drawings, wherein the present invention is not limited to the exemplary embodiment. Essential features of the present invention, which are only shown in the figures of the drawings, are within the scope of the present invention and may, individually or in combination, form basis of further advantageous configurations, wherein.

DETAILED DESCRIPTION

Figure 1:
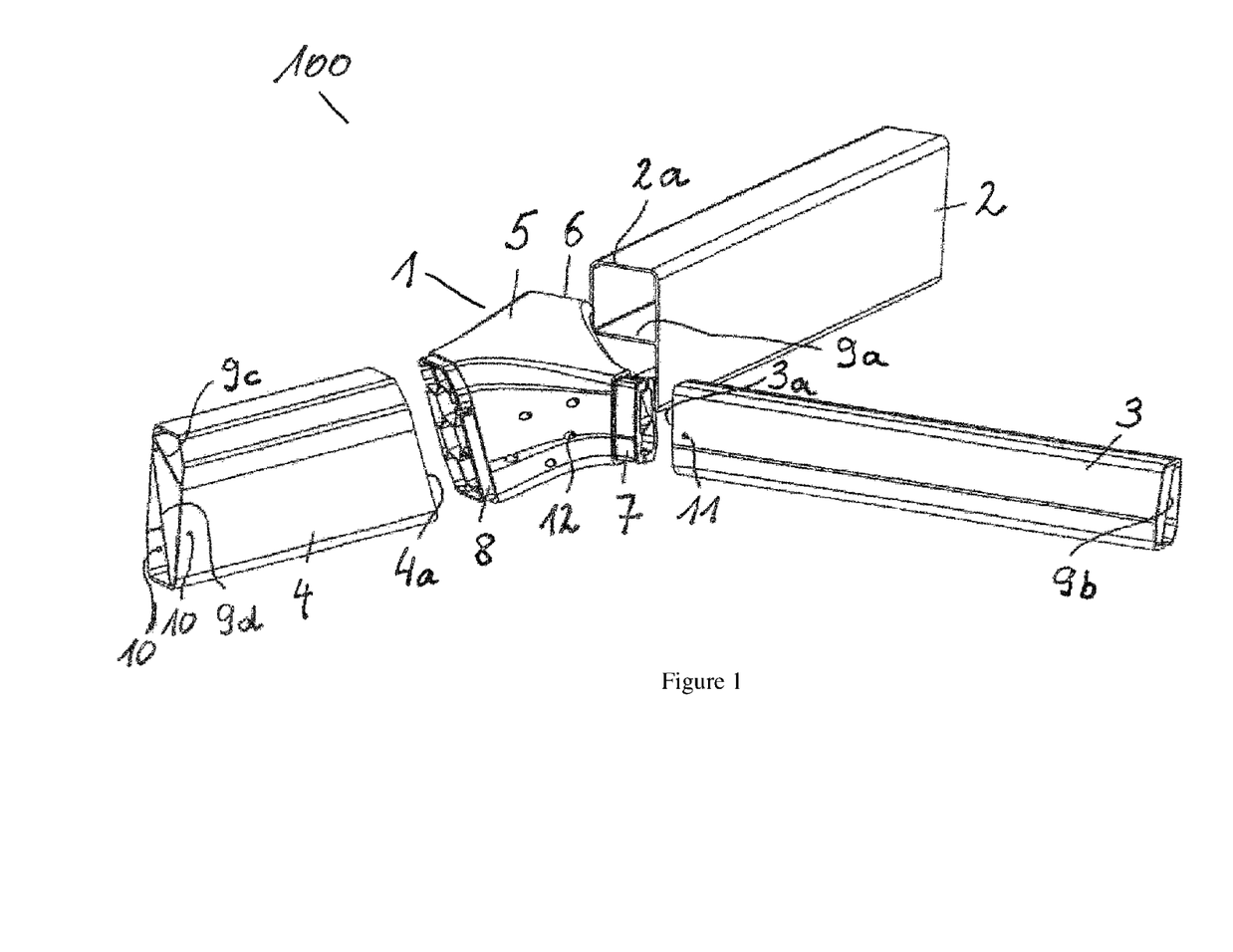
FIG. 1 shows a system with an additively manufactured connection node comprising three connection bodies before assembly.

FIG. 1 shows a system 100 having an additively manufactured connection node 1, a first connection body 2 in the form of a multi-chamber hollow section, a second connection body 3 in the form of a multi-chamber hollow section and a third connection body 4 in the form of a multi-chamber hollow section. The connection node 1 comprises a connection node central body 5, a first connection element 6, which is not visible in the view shown, a second connection element 7 and a third connection element 8. In the embodiment, the central connection node body 5 and the connection elements 6, 7, 8 are manufactured together in a single process, for example by means of a 3D printing process, thus forming a quasi-monolith.

The connection node 1 does not have to be manufactured additively or at least not completely additively, but may also be a cast part or cast part with printed additive structures.

The connection bodies 2, 3, 4, i.e. the multi-chamber hollow profiles are each formed differently, i.e. they have different external shapes, different wall thicknesses and different numbers of individually arranged profile inner walls 9a, 9b, 9c, 9d.

According to the embodiment shown, the connection elements 6, 7, 8 protrude from the connection node central body 5, such that the connection bodies 2, 3, 4 may be slid onto the connection elements 6, 7, 8 in order to be joined with connection node 1 in the slid-on state. The connection bodies 3, 4 comprise openings 10, 11 in the side walls, through which, for example, an adhesive may be pressed in to join connection bodies 2, 3, 4 with connection node 1. As may be seen exclusively with respect to the third connection body 4, each chamber is accessible via its own opening 10. In the embodiment, the openings 10 are only indicated on the side facing away from the connection node 1, with which the connection body 4 may be connected to another connection node (not shown) or to a structural or functional part.

In order to be able to press or inject the adhesive into the respective connection joint, groove-shaped openings may alternatively be formed on the end faces 2a, 3a, 4a of the connection bodies 2, 3, 4 facing the connection node. In this case it is also advantageous if a separate groove-shaped opening is formed for each of the chambers of a multi-chamber hollow profile.

The connection node central body 1 also comprises openings 12. These openings may be used, for example, to prevent pressure from building up inside the connection node 1 due to heating by solar radiation or the like.

Figure 2:
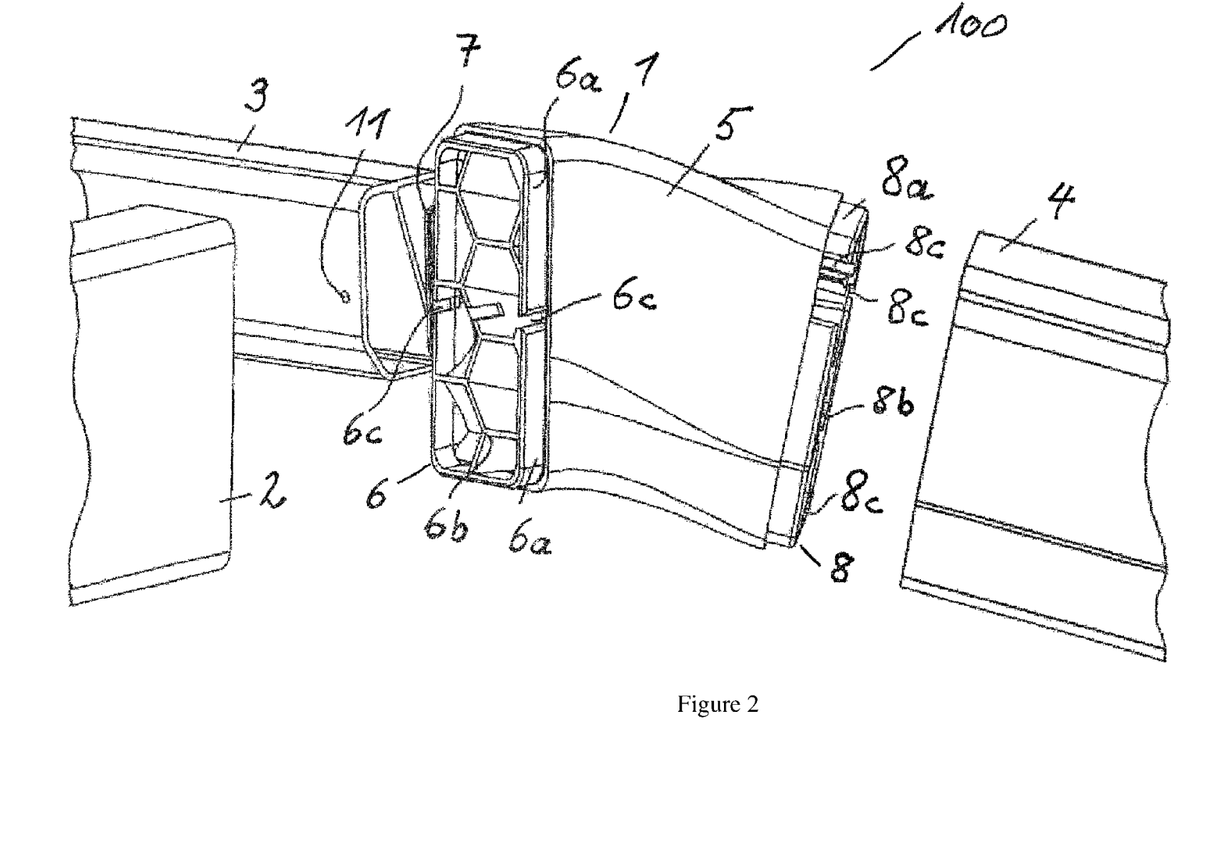
FIG. 2 shows a perspective view of the system of FIG. 1.

FIG. 2 shows a view of the connection element 6 in the system shown of FIG. 1. The connection element consists substantially of a frame 6a and a honeycomb-like stiffening structure 6b, which extends into the connection node central body 5. The frame 6a comprises slotted grooves 6c which, when the connection body 2 is slid onto the connector 6, receive the inner profile wall 9a, which is not visible here, of the connection body 2. The structure of the connection element 6 corresponds at least substantially to that of the connection element 8, in which a frame 8a, a stiffening structure 8*b* and grooves 8*c* are also visible. The grooves 8*c* are arranged in the frame 8*a* in such a way that they may receive the inner profile walls 9*c* and 9*d* (see FIG. 1).

Connection elements 6, 7, 8 protrude from the connection node central body 5 and are connected to connection node central body 5 in one step. The height or depth of the step corresponds to the thickness of the outer wall of the connection body at the respective end face 2*a*, 3*a*, 4*a*, which comes into contact with the connection body central body 5 when connecting connection element 2, 3, 4 with connection node 1. Since the thicknesses of the outer walls of a connection element 6, 7, 8 may vary, the height or depth of the steps is adapted accordingly in each case such that no edge is formed at the joints between the connection node 1 and the connection bodies 2, 3, 4. This means that the outer surface of connection node 1 and each of the outer surfaces of connection bodies 2, 3, 4 are arranged in a common plane at the interface.

Figure 3:
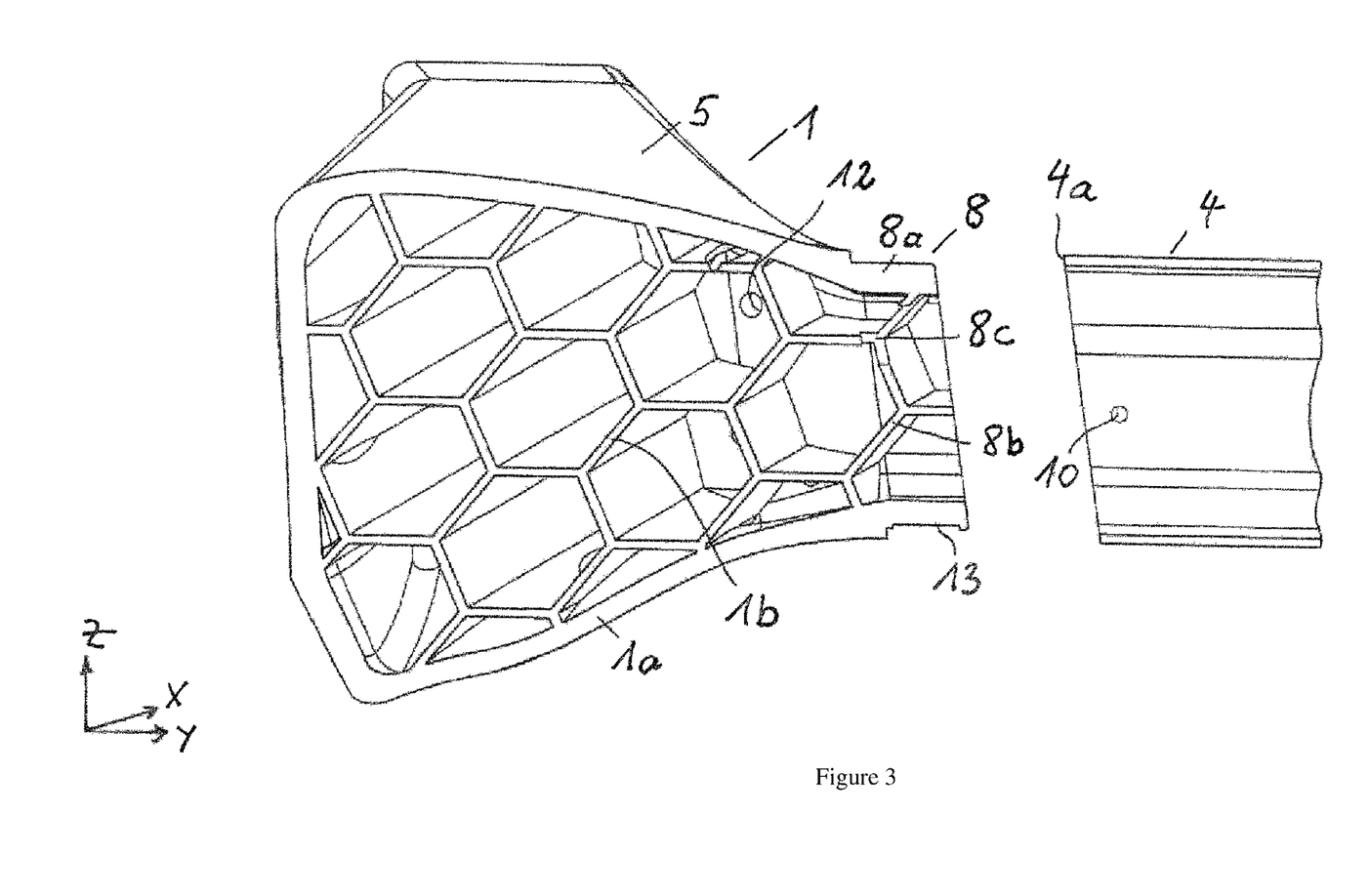
FIG. 3 shows a sectional view of a connection node central body comprising connection elements.

FIG. 3 shows a sectional view through the connection node 1 and the third connection element 8 and also the connection body 4. The connection element 8 comprises a pocket 13 into which an adhesive may be injected or pressed from the outside when the connection body 4 is fully slid onto the connection element. Alternatively, an adhesive, e.g. in the form of an adhesive film, may be inserted into the pocket 13 before connecting the connection body 4 to the connection node 1, and the adhesive may be activated after sliding the connection body 4 onto the connection element 8, e.g. by applying heat. The adhesive connection, whether with flowable adhesive or adhesive film, has the advantage that the adhesive may compensate for tolerances between the two parts without deforming them plastically. In addition to using an adhesive, structure 100 may be secured against unintentional loosening of one of the connection bodies 2, 3, 4 under stress by using, for example, screws, blind rivets or other suitable means. Finally, the connection bodies 2, 3, 4 do not need to be glued to the respective connection element 6, 7, 8, but may be joined, screwed, riveted, welded, soldered or otherwise connected to each other without adhesive.

Figure 4:
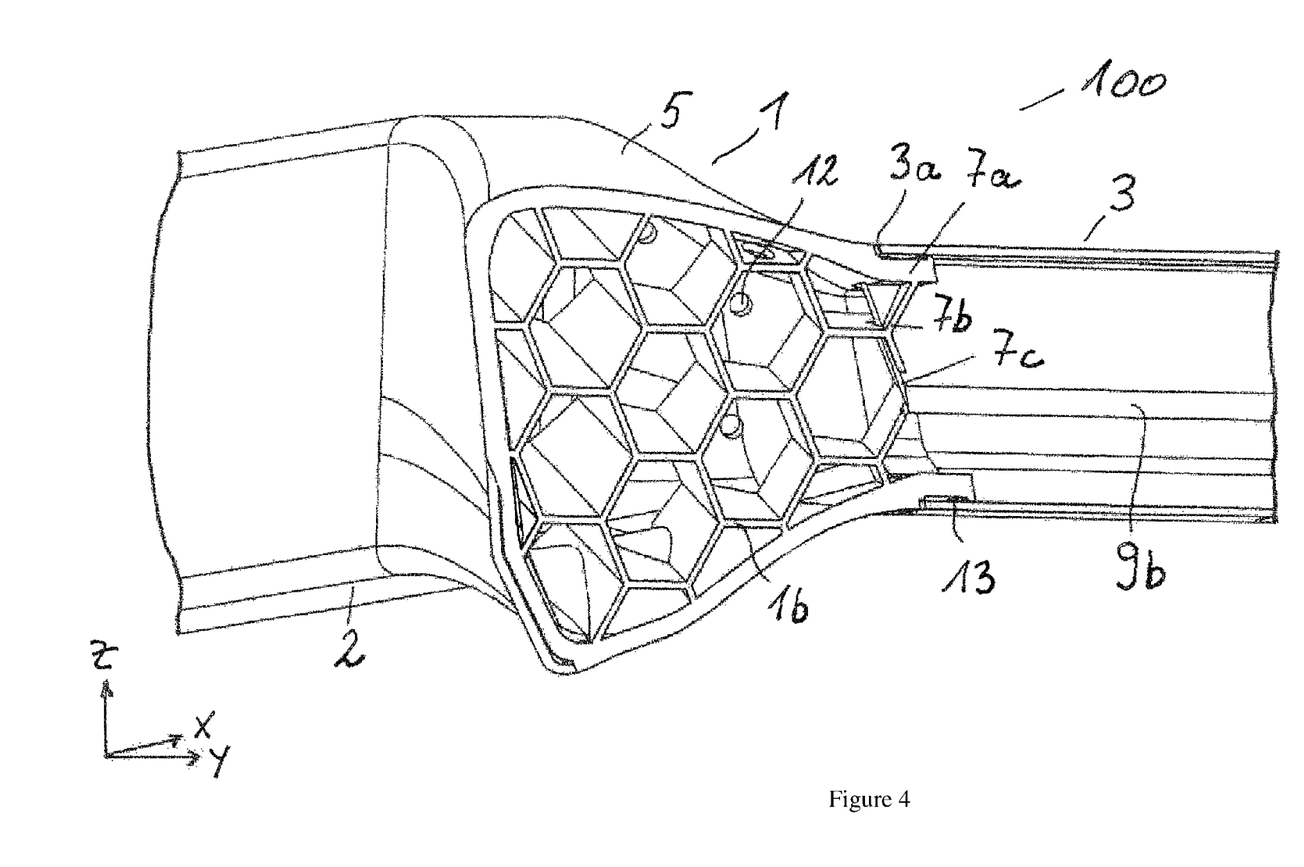
FIG. 4 shows a sectional view of a connection element comprising joined connection bodies.

FIG. 4 shows the system 100 in the joined state in a sectional view along the connection element 7. The pocket 13 for the adhesive is now covered by one side of the connection body 3, such that an adhesive (which is not visible in this sectional view) that may be inserted into the pocket 13 through the opening 11, is substantially trapped within the pocket 13 and may at most penetrate into gaps, that are caused due to tolerances between connection element 7 and connection body 3, and may cure within the gaps. This is advantageous for compensating the tolerances.

LIST OF REFERENCE SIGNS

100 System
1 connection node
1*a* Outer skin
1*b* Stiffening structure
2 Connection body
2*a* End face
3 Connection body
3*a* End face
4 Connection body
4*a* End face
5 Connection node central body
6 Connection element
6*a* Frame
6*b* Stiffening structure
6*c* Groove
7 Connection element
7*a* Frame
7*b* Stiffening structure
7*c* Groove
8 Connection element
8*a* Frame
8*b* Stiffening structure
8*c* Groove
9*a* Profile inner wall
9*b* Profile inner wall
9*c* Profile inner wall
9*d* Profile inner wall
10 Opening
11 Opening
12 Opening
13 Pocket

The invention claimed is:

1. A system, comprising:
    a first connection body, which is formed as a multi-chamber hollow profile,
    at least one second connection body; and
    a connection node comprising a connection node central body, which is at least partly manufactured by means of an additive process, or by means of a casting process, a first connection element connected to the connection node central body for joining to the connection body and at least one second connection element connected to the connection node central body for joining to a second connection body;
    wherein the first connection element on an end face facing the first connection body comprises a plurality of engagement elements which are configured to engage in chambers of the first connection body formed as a multi-chamber hollow profile,
    wherein each of the engagement elements has a pocket, the pocket being formed on a first side facing an inner side of an outer wall of the connection node central body or on a second side facing an inner side of an outer wall of the connection body or on both the first and the second sides, and
    wherein the pockets can be filled with adhesive for bonding the first connection body and the first connection element.

2. The system according to claim 1, wherein the additive process includes 3D printing.

3. The system according to claim 1, wherein at least one of the first connection element and the second connection element are at least partly manufactured by means of an additive process or by means of a casting process.

4. The system according to claim 1, wherein the first connection element comprises a frame and a honeycomb-like stiffening structure which extends into the connection node central body, wherein the frame comprises slot-like grooves which are arranged to receive a profile inner wall of the first connection body.

5. The system according to claim 4, wherein the connection node central body or the first connection body have, near at least one of the peripheral outer walls of an end face facing the connection node central body, at least one opening through which the adhesive can be inserted into the respective pocket.

6. The system according to claim 1, wherein the connection node connects parts of a vehicle frame to one another, and the second connection element or a third connection element forms a suspension strut mount or can be connected to a suspension strut mount.

7. The system according to claim 1, wherein the second connection body is formed as a multi-chamber hollow profile, wherein the second connection element comprises a plurality of engagement elements at an end face facing the first connection body, which engagement elements are configured to be inserted in chambers of the second connection body formed as a multi-chamber hollow profile, wherein each of the engagement elements has a pocket at least on one of the sides facing an inner side of an outer wall of the connection node central body or the connection body, and wherein the pockets can be filled with adhesive for bonding the second connection body and the first connection element.

8. A connection node for connecting to a first connection body and at least one second connection body, wherein the connection node comprises:
- a connection central body, which is at least partly manufactured by means at least one of an additive process and by means of a casting process,
- a first connection element for connecting to the first connection body; and
- at least one second connection element for connecting to the at least one second connection body;
- wherein the first connection element comprises at an end face a plurality of engagement elements which are configured to engage in chambers of a first connection body formed as a multi-chamber hollow profile,
- wherein each of the engagement members comprises a pocket, the pocket being formed on a first side facing an inner side of an outer wall of the connection node central body or on a second side facing an inner side of an outer wall of the connection body or on both the first and second sides, and
- wherein the pockets can be filled with adhesive for bonding the first connection body and the first connection element.

9. The connection node according to claim 8, wherein the connection node central body is connected, connectable or formed in one piece with the first connection element and the at least one second connection element.

10. The connection node according to claim 8, wherein the connection node central body and the first connection element are at least partly manufactured by means of the additive process.

11. The connection node according to claim 10, wherein the at least one second connection element are at least partly manufactured by means of the additive process.

12. The connection node according to claim 8, wherein at least the connection node central body is manufactured in a skeleton shape.

13. The connection node according to claim 12, wherein the skeleton shape includes local stiffeners and wall thicknesses which are adapted to a local force flow.

14. The connection node according to claim 8, wherein the connection node central body and the connection elements comprise hollow structures.

15. The connection node according to claim 14, wherein the hollow structures comprise stiffening structures adapted to the local direction of force flow.

16. The connection node according to claim 15, wherein stiffening structures include a strut, lattice or honeycomb structure.

17. The connection node according to claim 8, wherein the connection node comprises an at least substantially closed outer skin in order to prevent soiling.

18. The connection node according to claim 8, wherein the second connection element comprises a plurality of engagement elements on an end face facing the first connection body, which are configured to engage in chambers of the second connection body formed as a multi-chamber hollow profile, wherein each of the engagement elements has a pocket at least on one of the sides facing an inner side of an outer wall of the connection node central body or the connection body, and wherein the pockets can be filled with adhesive for bonding the second connection body and the first connection element.

19. The connection node according to claim 8, wherein the connection node central body and the connection elements are jointly primary formed in one piece by means of the additive process.

20. A method for assembling a system comprising a first connection body, which is formed as a multi-chamber hollow profile, at least one second connection body, and a connection node comprising a connection node central body, which is at least partly manufactured by means of an additive process or by means of a casting process, a first connection element connected to the connection node central body for joining to the connection body and at least one second connection element connected to the connection node central body for joining to a second connection body, wherein the first connection element on an end face facing the first connection body comprises a plurality of engagement elements which are configured to engage in chambers of the first connection body formed as a multi-chamber hollow profile, wherein each of the engagement elements has a pocket at least on one of the sides facing an inner side of an outer wall of the connection node central body or the connection body, and wherein the pockets can be filled with adhesive for bonding the first connection body and the first connection element, the method comprising:
- sliding the connection bodies onto the connection elements of the connection node; and
- producing an adhesive connection between the connection bodies and the connection elements, wherein after the step of sliding on, an adhesive is injected or pressed into the pockets from outside, or before the step of sliding on, an adhesive is inserted into the pockets and is activated after the step of sliding on.

* * * * *